(12) United States Patent
Ahn et al.

(10) Patent No.: US 8,238,302 B2
(45) Date of Patent: Aug. 7, 2012

(54) METHOD OF DETERMINING A SIZE OF A DATA PACKET ADVANTAGEOUS FOR TRANSMITTING AND RESTRANSMITTING THE DATA PACKET

(75) Inventors: Joon Kui Ahn, Anyang-si (KR); Bong Hoe Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 12/747,152

(22) PCT Filed: Feb. 4, 2009

(86) PCT No.: PCT/KR2009/000542
§ 371 (c)(1),
(2), (4) Date: Jun. 9, 2010

(87) PCT Pub. No.: WO2009/099295
PCT Pub. Date: Aug. 13, 2009

(65) Prior Publication Data
US 2010/0290412 A1    Nov. 18, 2010

Related U.S. Application Data

(60) Provisional application No. 61/026,139, filed on Feb. 5, 2008.

(30) Foreign Application Priority Data

Dec. 12, 2008    (KR) ................. 10-2008-0126457

(51) Int. Cl.
*H04W 4/00* (2009.01)
(52) U.S. Cl. ........................................ 370/329
(58) Field of Classification Search .......... 370/328–477; 455/450–509
See application file for complete search history.

(56) References Cited

U.S. PATENT DOCUMENTS

| | | | |
|---|---|---|---|
| 6,999,439 B2 * | 2/2006 | Takano | 370/335 |
| 2003/0074476 A1 | 4/2003 | Kim et al. | |
| 2003/0123409 A1 | 7/2003 | Kwak et al. | |
| 2003/0123470 A1 | 7/2003 | Kim et al. | |
| 2004/0081181 A1 | 4/2004 | Malkamaki | |
| 2007/0287449 A1 | 12/2007 | Ju et al. | |
| 2008/0240022 A1 | 10/2008 | Yoon et al. | |

FOREIGN PATENT DOCUMENTS

KR    10-2005-0053312 A    6/2005
* cited by examiner

*Primary Examiner* — Anh-Vu Ly
*Assistant Examiner* — Mang Yeung
(74) *Attorney, Agent, or Firm* — Birch, Stewart, Kolasch & Birch LLP

(57) ABSTRACT

A method of determining a transport block size (TBS) allocated to a data packet transmitted via a wireless channel is provided. The TBS is determined according to the number of resource blocks (resource block number) NRB allocated to the data packet and a modulation coding scheme (MCS) level. A part or all of the TBSs allocated to a specific resource block number is determined to have the same value as a part or all of the TBSs allocated to another resource block number.

9 Claims, 7 Drawing Sheets

| MCS index | MCS modulation | MCS code rate | \multicolumn{15}{c}{Number of RBs} |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| 0 | QPSK | 0.1 | 20 | 40 | 60 | 80 | 100 | 120 | 140 | 160 | 180 | 200 | 220 | 240 | 260 | 280 | 300 |
| 1 | QPSK | 0.2 | 40 | 80 | 120 | 160 | 200 | 240 | 280 | 320 | 360 | 400 | 440 | 480 | 520 | 560 | 600 |
| 2 | QPSK | 0.3 | 60 | 120 | 180 | 240 | 300 | 360 | 420 | 480 | 540 | 600 | 660 | 720 | 780 | 840 | 900 |
| 3 | QPSK | 0.4 | 80 | 160 | 240 | 320 | 400 | 480 | 560 | 640 | 720 | 800 | 880 | 960 | 1040 | 1120 | 1200 |
| 4 | QPSK | 0.5 | 100 | 200 | 300 | 400 | 500 | 600 | 700 | 800 | 900 | 1000 | 1100 | 1200 | 1300 | 1400 | 1500 |
| 5 | 16QAM | 0.6 | 240 | 480 | 720 | 960 | 1200 | 1440 | 1680 | 1920 | 2160 | 2400 | 2640 | 2880 | 3120 | 3360 | 3600 |
| 6 | 16QAM | 0.7 | 280 | 560 | 840 | 1120 | 1400 | 1680 | 1960 | 2240 | 2520 | 2800 | 3080 | 3360 | 3640 | 3920 | 4200 |
| 7 | 16QAM | 0.8 | 320 | 640 | 960 | 1280 | 1600 | 1920 | 2240 | 2560 | 2880 | 3200 | 3520 | 3840 | 4160 | 4480 | 4800 |
| 8 | 16QAM | 0.9 | 360 | 720 | 1080 | 1440 | 1800 | 2160 | 2520 | 2880 | 3240 | 3600 | 3960 | 4320 | 4680 | 5040 | 5400 |

[Fig. 1]

| MCS index | MCS modulation | code rate | Number of RBs | | | | | | | | | | | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| 0 | QPSK | 0.1 | 20 | 40 | 60 | 80 | 100 | 120 | 140 | 160 | 180 | 200 | 220 | 240 | 260 | 280 | 300 |
| 1 | QPSK | 0.2 | 40 | 80 | 120 | 160 | 200 | 240 | 280 | 320 | 360 | 400 | 440 | 480 | 520 | 560 | 600 |
| 2 | QPSK | 0.3 | 60 | 120 | 180 | 240 | 300 | 360 | 420 | 480 | 540 | 600 | 660 | 720 | 780 | 840 | 900 |
| 3 | QPSK | 0.4 | 80 | 160 | 240 | 320 | 400 | 480 | 560 | 640 | 720 | 800 | 880 | 960 | 1040 | 1120 | 1200 |
| 4 | QPSK | 0.5 | 100 | 200 | 300 | 400 | 500 | 600 | 700 | 800 | 900 | 1000 | 1100 | 1200 | 1300 | 1400 | 1500 |
| 5 | 16QAM | 0.6 | 240 | 480 | 720 | 960 | 1200 | 1440 | 1680 | 1920 | 2160 | 2400 | 2640 | 2880 | 3120 | 3360 | 3600 |
| 6 | 16QAM | 0.7 | 280 | 560 | 840 | 1120 | 1400 | 1680 | 1960 | 2240 | 2520 | 2800 | 3080 | 3360 | 3640 | 3920 | 4200 |
| 7 | 16QAM | 0.8 | 320 | 640 | 960 | 1280 | 1600 | 1920 | 2240 | 2560 | 2880 | 3200 | 3520 | 3840 | 4160 | 4480 | 4800 |
| 8 | 16QAM | 0.9 | 360 | 720 | 1080 | 1440 | 1800 | 2160 | 2520 | 2880 | 3240 | 3600 | 3960 | 4320 | 4680 | 5040 | 5400 |

[Fig. 2]

| MCS index | MCS modulation | MCS code rate | Number of RBs |  |  |  |  |  |  |  |  |  |  |  |  |  |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| 0 | QPSK | 0.1 | 40 | 40 | 40 | 100 | 100 | 100 | 160 | 160 | 160 | 220 | 220 | 220 | 280 | 280 | 280 |
| 1 | QPSK | 0.2 | 80 | 80 | 80 | 200 | 200 | 200 | 320 | 320 | 320 | 440 | 440 | 440 | 560 | 560 | 560 |
| 2 | QPSK | 0.3 | 120 | 120 | 120 | 300 | 300 | 300 | 480 | 480 | 480 | 660 | 660 | 660 | 840 | 840 | 840 |
| 3 | QPSK | 0.4 | 160 | 160 | 160 | 400 | 400 | 400 | 640 | 640 | 640 | 880 | 880 | 880 | 1120 | 1120 | 1120 |
| 4 | QPSK | 0.5 | 200 | 200 | 200 | 500 | 500 | 500 | 800 | 800 | 800 | 1100 | 1100 | 1100 | 1400 | 1400 | 1400 |
| 5 | 16QAM | 0.6 | 480 | 480 | 480 | 1200 | 1200 | 1200 | 1920 | 1920 | 1920 | 2640 | 2640 | 2640 | 3360 | 3360 | 3360 |
| 6 | 16QAM | 0.7 | 560 | 560 | 560 | 1400 | 1400 | 1400 | 2240 | 2240 | 2240 | 3080 | 3080 | 3080 | 3920 | 3920 | 3920 |
| 7 | 16QAM | 0.8 | 640 | 640 | 640 | 1600 | 1600 | 1600 | 2560 | 2560 | 2560 | 3520 | 3520 | 3520 | 4480 | 4480 | 4480 |
| 8 | 16QAM | 0.9 | 720 | 720 | 720 | 1800 | 1800 | 1800 | 2880 | 2880 | 2880 | 3960 | 3960 | 3960 | 5040 | 5040 | 5040 |

| MCS index | MCS modulation | code rate | Number of RBs ||||||||||||||| 
| | | | 1 | 2 | 3 | 4 | 5 | 6 | 7 | 8 | 9 | 10 | 11 | 12 | 13 | 14 | 15 |
| --- | --- | --- | --- | --- | --- | --- | --- | --- | --- | --- | --- | --- | --- | --- | --- | --- | --- |
| 0 | QPSK | 0.1 | 20 | | | | | | | | | | | | | | |
| 1 | QPSK | 0.2 | 40 | 160 | | | | | | | | | | | | | |
| 2 | QPSK | 0.3 | 60 | 240 | | | | | | | | | | | | | |
| 3 | QPSK | 0.4 | 80 | 280 | | | | | | | | | | | | | |
| 4 | QPSK | 0.5 | 100 | 320 | | | | | | | | | | | | | |
| 5 | 16QAM | 0.6 | 100 | 360 | | | | | | | | | | | | | |
| 6 | 16QAM | 0.7 | 240 | 480 | | | | | | | | | | | | | |
| 7 | 16QAM | 0.8 | 280 | 560 | | | | | | | | | | | | | |
| 8 | 16QAM | 0.9 | 320 | 640 | | | | | | | | | | | | | |
| | | | 360 | 720 | | | | | | | | | | | | | |

| MCS index | MCS modulation | MCS code rate | Number of RBs | | | | | | | | | | | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| 0 | QPSK | 0.1 | 20 | 100 | | | | | | | | | | | | | |
| 1 | QPSK | 0.2 | 40 | 240 | | | | | | | | | | | | | |
| 2 | QPSK | 0.3 | 60 | 280 | | | | | | | | | | | | | |
| 3 | QPSK | 0.4 | 80 | 320 | 320 | | | | | | | | | | | | |
| 4 | QPSK | 0.5 | 100 | 360 | 360 | | | | | | | | | | | | |
| 5 | 16QAM | 0.6 | 240 | 480 | 480 | | | | | | | | | | | | |
| 6 | 16QAM | 0.7 | 280 | 560 | 640 | | | | | | | | | | | | |
| 7 | 16QAM | 0.8 | 320 | 640 | 960 | | | | | | | | | | | | |
| 8 | 16QAM | 0.9 | 360 | 720 | 1080 | | | | | | | | | | | | |

| MCS index | MCS modulation | MCS code rate | Number of RBs | | | | | | | | | | | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| 0 | QPSK | 0.1 | 20 | 100 | 320 | 480 | 640 | 840 | 960 | 1080 | 1280 | 1440 | 1600 | 1800 | 1920 | 2160 | 2520 |
| 1 | QPSK | 0.2 | 40 | 240 | 360 | 560 | 720 | 960 | 1080 | 1280 | 1440 | 1600 | 1800 | 1920 | 2160 | 2520 | 2880 |
| 2 | QPSK | 0.3 | 60 | 280 | 480 | 640 | 840 | 1080 | 1280 | 1440 | 1600 | 1800 | 1920 | 2160 | 2520 | 2880 | 3240 |
| 3 | QPSK | 0.4 | 80 | 320 | 560 | 720 | 960 | 1280 | 1440 | 1600 | 1800 | 1920 | 2160 | 2520 | 2880 | 3240 | 3600 |
| 4 | QPSK | 0.5 | 100 | 360 | 640 | 840 | 1080 | 1440 | 1600 | 1800 | 1920 | 2160 | 2520 | 2880 | 3240 | 3600 | 3960 |
| 5 | 16QAM | 0.6 | 240 | 480 | 720 | 960 | 1280 | 1600 | 1800 | 1920 | 2160 | 2520 | 2880 | 3240 | 3600 | 3960 | 4320 |
| 6 | 16QAM | 0.7 | 280 | 560 | 840 | 1080 | 1440 | 1800 | 1920 | 2160 | 2520 | 2880 | 3240 | 3600 | 3960 | 4320 | 4680 |
| 7 | 16QAM | 0.8 | 320 | 640 | 960 | 1280 | 1600 | 1920 | 2160 | 2520 | 2880 | 3240 | 3600 | 3960 | 4320 | 4480 | 5040 |
| 8 | 16QAM | 0.9 | 360 | 720 | 1080 | 1440 | 1800 | 2160 | 2520 | 2880 | 3240 | 3600 | 3960 | 4320 | 4680 | 5040 | 5400 |

[Fig. 6]

| MCS index | MCS | | Number of RBs | | | | | | | | | | |
|---|---|---|---|---|---|---|---|---|---|---|---|---|---|
| | modulation | code rate | 1 | 2 | 3 | 4 | 5 | 6 | 7 | 8 | 9 | 10 | 11 |
| 0 | QPSK | 0.1 | 20 | 40 | | | | | | | | | |
| 1 | QPSK | 0.2 | 40 | 80 | | | | | | | | | |
| 2 | QPSK | 0.3 | 60 | 100 | | | | | | | | | |
| 3 | QPSK | 0.4 | 80 | 100 | | | | | | | | | |
| 4 | QPSK | 0.5 | 100 | 240 | | | | | | | | | |
| 5 | 16QAM | 0.6 | 240 | 480 | | | | | | | | | |
| 6 | 16QAM | 0.7 | 280 | 560 | | | | | | | | | |
| 7 | 16QAM | 0.8 | 320 | 640 | | | | | | | | | |
| 8 | 16QAM | 0.9 | 360 | 720 | | | | | | | | | |

[Fig. 7]

| MCS index | MCS modulation | code rate | Number of RBs | | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| 0 | QPSK | 0.1 | 20 | 40 | 60 | | | | | | | | | | | | |
| 1 | QPSK | 0.2 | 40 | 80 | 100 | | | | | | | | | | | | |
| 2 | QPSK | 0.3 | 60 | 100 | 240 | | | | | | | | | | | | |
| 3 | QPSK | 0.4 | 80 | 100 | 240 | | | | | | | | | | | | |
| 4 | QPSK | 0.5 | 100 | 240 | 320 | | | | | | | | | | | | |
| 5 | 16QAM | 0.6 | 240 | 480 | 720 | | | | | | | | | | | | |
| 6 | 16QAM | 0.7 | 280 | 560 | 840 | | | | | | | | | | | | |
| 7 | 16QAM | 0.8 | 320 | 640 | 960 | | | | | | | | | | | | |
| 8 | 16QAM | 0.9 | 360 | 720 | 1080 | | | | | | | | | | | | |

METHOD OF DETERMINING A SIZE OF A DATA PACKET ADVANTAGEOUS FOR TRANSMITTING AND RESTRANSMITTING THE DATA PACKET

This application is a National Phase of PCT International Application No. PCT/KR2009/000542 filed on Feb. 4, 2009, and claims priority under 35 U.S.C. §119(a) to Patent Application No. 10-2008-0126457 filed in Republic of Korea on Dec. 12, 2008, and under 35 U.S.C. §119(e) to U.S. Provisional Application No. 61/026,139 filed in United States on Feb. 5, 2008, all of which are hereby expressly incorporated by reference into the present application.

TECHNICAL FIELD

The present invention relates to a wireless mobile communication system, and more particularly, to implementation of a modulation coding scheme (MCS)/transport block size (TBS) capable of efficiently implementing signaling for informing of a data amount and/or the MCS in a wireless packet communication system.

BACKGROUND ART

In a wireless packet communication system, when a transmitter transmits data to a receiver, any amount of data stream is converted into a coded bit stream by, for example, channel coding such as turbo coding. The coded bit stream constitutes a transport data packet. Thereafter, the number of bits to be transmitted by a wireless resource is determined according to the amount of wireless resources for transmitting the data packet (for example, the amount of time/frequency resource in case of an orthogonal frequency division multiplexing (OFDM) system, the number of code division multiplexing (CDM) codes in case of a CDM system, or the like) and a modulation scheme (BPSK, QPSK, 16QAM, 64QAM, or the like). The coded bit stream (data packet) is subjected to rate matching according to the determined number of bits and is then transmitted. At this time, the transmitter should inform the receiver of the amount of wireless resources used for transmission of the data packet, a modulation scheme, a code rate, a data amount, and so on. In a case where a base station operates as a receiver and a scheduler in the base station controls the packet transmission of wireless mobile stations controlled by the base station, the base station informs the mobile stations of the amount of wireless resources which can transmit the data packet by the mobile stations, a modulation scheme, a code rate, a data amount, and so on.

DISCLOSURE OF INVENTION

Technical Problem

An object of the present invention devised to solve the problem lies on implementation of a modulation coding scheme/transport block size (MCS/TBS) capable of efficiently implementing signaling for informing of a data amount such as a TBS, and/or the MCS, when the amount of wireless channel resources used for an original data transmitted is different from the amount of wireless channel resources used for a retransmission of the original data in a wireless packet communication system.

Technical Solution

The object of the present invention can be achieved by providing a method of determining the data size of a received data packet in a wireless mobile communication system, the method including: receiving a wireless resource number allocated to the data packet and receiving a reference modulation coding scheme (MCS), which is applied to the data packet, of a plurality of predetermined reference MCSs; and determining the data size indicated by a combination of the received wireless resource number and the received reference MCS, wherein a plurality of second size values corresponding to a second value of the wireless resource number satisfies the plurality of predetermined reference MCSs, and a plurality of first size values corresponding to a first value of the wireless resource number are equal to the plurality of second size values, and the first value is greater or less than the second value by 1.

Preferably, the wireless resource number may be the number of resource blocks, and the data size may be a transport block size (TBS).

In another aspect of the present invention, provided herein is a method of determining the data size of a received data packet in a wireless mobile communication system, the method including: receiving a wireless resource number allocated to the data packet and receiving a reference modulation coding scheme (MCS), which is applied to the data packet, of a plurality of predetermined reference MCSs; and determining the data size indicated by a combination of the received wireless resource number and the received reference MCS, wherein a part of a plurality of first size values corresponding to a first value of the wireless resource number is equal to a part of a plurality of second size values corresponding to a second value of the wireless resource number, and the residual part of the plurality of first size values satisfies the plurality of predetermined reference MCSs.

Preferably, a code rate of the part of the plurality of first size values may be less than that of the residual part of the plurality of first size values, and the first value may be greater than the second value by 1.

The part of the plurality of second size values may include n upper-level second size values including a second size value having a highest code rate among the plurality of second size values, and n may be a predetermined value.

Preferably, the code rate of the part of the plurality of first size values may be greater than that of the residual part of the plurality of first size values, and the first value may be less than the second value by 1.

Preferably, the part of the plurality of second size values may include n lower-level second size values including a second size value having a lowest code rate among the plurality of second size values, and n may be a predetermined value.

Preferably, the code rate of the part of the plurality of first size values may be less than that of the residual part of the plurality of first size values, and the first value may be greater than the second value.

Preferably, the code rate of the part of the plurality of first size values may be greater than that of the residual part of the plurality of first size values, and the first value may be less than the second value.

Preferably, each of the plurality of second size values may satisfy a reference MCS corresponding thereto in the plurality of predetermined reference MCSs.

Preferably, the wireless resource number may be the number of resource blocks.

The present invention is applicable regardless of a multiplexing scheme. That is, the present invention is not restricted by, for example, an OFDMA scheme or a CDMA scheme.

Advantageous Effects

According to the present invention, the same transport block size (TBS) can be reused over several resource block number $N_{RB}$ and a reference modulation coding scheme (MCS) for performing a channel test is supported.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 shows data amounts (transport block sizes (TBSs)) corresponding to the number of resource blocks (RBs) $N_{RB}$ and reference modulation coding schemes (MCSs).

FIG. 2 shows a method of defining a plurality of reference RB numbers $R\_N_{RB}$ which are not adjacent to each other and using TBSs used in the reference RB numbers R_N RB for neighboring RB numbers ($N\_N_{RB}$) adjacent to the defined reference RB numbers $R\_N_{RB}$.

FIGS. 3 to 5 show other embodiments of the present invention.

FIGS. 6 and 7 show other embodiments of the present invention.

MODE FOR THE INVENTION

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details. For example, although specific terms are described in the following description, the terms are not limited to the specific terms and other terms may have the same meaning. The same reference numbers will be used throughout the drawings to refer to the same or like parts.

A wireless channel resource unit for transmitting a packet is defined as a resource block (RB). FIG. 1 is a view showing data amounts (transport block sizes (TBSs)) corresponding to the number of resource blocks (RBs) $N_{RB}$ (hereinafter, referred to as the number $N_{RB}$) and reference modulation coding schemes (MCSs). At this time, the TBS indicates the number of bits. The wireless channel resource may be resources such as frequency, time, space, spread code, or the like. Generally, a basic packet transmission unit may be called as RB. However, for example, in the $3^{rd}$ generation partnership project (3GPP) long term evolution (LTE), the basic packet transmission unit is a pair of RBs which extend in a time axis.

In FIG. 1, it is assumed that one RB includes 100 modulation symbols. Hereinafter, it is assumed that the number of modulation symbols included in one RB is 100 in all the embodiments of the present specification. This assumption is only exemplary and is not intended to limit the scope of the present invention. In addition, it is assumed that the MCSs which are supported at the time of a packet transmission include nine combinations such as QPSK/0.1, QPSK/0.2, QPSK/0.3, QPSK/0.4, QPSK/0.5, 16QAM/0.6, 16QAM/0.7, 16QAM/0.8 and 16QAM/0.9. For example, QPSK/0.1 indicates that a modulation scheme is QPSK and a code rate is 0.1. The nine MCSs have indexes of 0 to 8, respectively. The MCSs may have other combinations, instead of the above-described combination of the nine reference MCSs. The reference MCSs shown in the drawing of the present invention are exemplary for describing the present invention and the reference MCS values are not limited to them. In FIG. 1, the above-described nine MCSs are referred to as the reference MCSs. In FIG. 1, the number $N_{RB}$ for transmitting a packet is selected in a range of 1 RB to 15 RBs. Although channel coding may be performed in a state in which a cyclic redundancy checking (CRC) of an N_crc bit is added to each transport block (TB), it is assumed that N_crc=0 in FIG. 1. The number $N_{RB}$ may be denoted by "N_rb", the code rate may be denoted by "R", and a modulation rate may be denoted by "m". For example, m equals '2' in case of QPSK and m equals '4' in case of 16QAM. In FIG. 1, the TBS value may be obtained by Equation 1.

$$TBS = f(N\_rb \times m \times R) - N\_crc \qquad [\text{Equation 1}]$$

Rounding, rounding-off and rounding-up may be applied to the output value of a function f.

At this time, in order to quantize the TBSs of FIG. 1 in the unit of 8 bits, the TBS value calculated by Equation 1 may be changed to a nearest integer which is divisible by 8. Alternatively, for example, if the size of an interleaver for a coded bit stream which is supported by the system is restricted, the TBS value calculated by Equation 1 may be changed to be suitable for a nearest interleaver size. That is, the TBS values calculated by Equation 1 may be changed in order to satisfy system restriction. Like this, if TBS values supported by the system are restricted due to any reason, the TBS values shown in FIG. 1 may be changed to a nearest value of the TBS values supported by the system again. The TBS values which can be obtained by the below-described embodiments of the present invention may be changed according to the system restriction again as described above.

Basically, the TBS value applied to any packet can be specified if the MCS and the number $N_{RB}$ are known. As shown in FIG. 1, the MCS can be specified if the MCS index is known. Accordingly, the MCS index and the number $N_{RB}$ can be transmitted without directly transmitting the TBS value. That is, as shown in FIG. 1, if the MCS and the number $N_{RB}$ are given, a corresponding TBS can be calculated.

For example, as described above, in FIG. 1, it is assumed that N_rb=100 and N_crc=0. At this time, if two RBs are used and the MCS index is 4, the TBS is equal to 2 (=$N_{RB}$)*100 (=number of modulation symbols included in each RB)*2 (=modulation order (QPSK) of the MCS index of 4))*0.5 (=code rate of the MCS index of 4)=200 bits (see 101 of FIG. 1). Similarly, each value of FIG. 1 may be immediately calculated by the MCS and the number $N_{RB}$ corresponding thereto. That is, in FIG. 1, the nine reference MCSs, that is, reference combinations of "reference modulation orders" and "reference code rates", are defined, and the TBS values defined in each number $N_{RB}$ are determined so as to satisfy above-defined reference MCSs.

If it is assumed that the MCS itself is actually signaled, bit overhead may be increased compared with the case where the nine MCS indexes are transmitted in a state in which the reference MCS information is shared among the transmitter and the receiver shown in FIG. 1. Accordingly, it is preferable that the MCS index is transmitted and the MCS value is then obtained from the transmitted MCS index, without directly transmitting the MCS itself.

Meanwhile, FIG. 1 shows the TBSs calculated by the above-described method. If there is a system restriction that the TBS value should be, for example, a multiple of 8, some of the TBS values of FIG. 1 need to be changed. For example, as described above, if the number $N_{RB}$ is 2, the modulation order is QPSK, and the code rate is 0.5, the calculated TBS is 200 bits. The value of 200 may be changed to any one of 196 or 204 which is a multiple of 8 and is nearest to 200. If the TBS value is changed, the code rate does not satisfy 0.5 any more which is the reference code rate. However, if the TBS value is changed to a value which is a multiple of 8 and is "nearest to" 200, the code rate value corresponding to the TBS does not significantly deviate from 0.5 which is the reference code rate. That is, if the system restriction is present and the TBS value is adjusted in order to satisfy the restriction, the TBS may be changed in a manner of enabling the changed code rate to be nearest to the above-described reference code rate.

Referring back to FIG. 1, the TBSs are determined so as to satisfy the reference code rates. That is, the TBSs are determined so as to satisfy the reference MCSs with respect to all the numbers $N_{RB}$. At this time, when any TB is retransmitted, a problem may occur. That is, if a first number $N_{RB}$ used when any TB is first transmitted is different from a second number $N_{RB}$ used when the TB is retransmitted, a problem may occur. For example, when the TBSs of FIG. 1 are used, it can be assumed that the transmitter transmits a TB having a size of 300 bits via three RBs (102). At this time, there are chances that the same TB is retransmitted. This retransmission may be performed via four RBs. However, in this case, since a configuration satisfying both $N_{RB}=4$ and TBS=300 is not defined in FIG. 1, the retransmission cannot be performed via the four RBs in a state in which TBS=300 is set. Generally, in a transmission/reception environment between a plurality of mobile stations and a base station, the $N_{RB}$ used when any TB is retransmitted may be different from the $N_{RB}$ used when the same TB is previously transmitted. At this time, in order to efficiently use the wireless channel resources, the $N_{RB}$ at the time of retransmission may be changed within any range. From a viewpoint of efficient retransmission, it is efficient that the same TBS is reused over several numbers "$N_{RB}$". If the same TBS is reused over several numbers $N_{RB}$, since the number of available TBSs decreases, it is difficult to support MCSs near to the reference MCSs in each number $N_{RB}$. In the wireless communication system, it is necessary to support the reference MCSs for a test for adjusting scheduling accuracy and channel state estimation between a transmitter and a receiver.

In order to efficiently change the number $N_{RB}$ at the time of retransmission and enable the system test, according to the present invention, some of TBSs are defined not to satisfy the reference MCSs for at least some of the numbers $N_{RB}$. That is, in the present invention, the TBSs may be defined such that the reference MCSs with respect to only a part of the numbers $N_{RB}$ (a specific number $N_{RB}$ or a plurality of specific numbers $N_{RB}$) which may be allocated at the time of a packet transmission. That is, the method of FIG. 1 is applied to a specific number $N_{RB}$. For example, in FIG. 1, the TBSs are determined to satisfy the reference MCSs only when the number $N_{RB}$ is 2, 5 and 8, and to satisfy other conditions with respect to other numbers $N_{RB}$. Accordingly, the system can perform the accuracy test with a specific number $N_{RB}$ or specific numbers $N_{RB}$ which satisfy the reference MCSs.

In the present invention, the number $N_{RB}$ in which the TBSs are determined so as to satisfy the reference MCSs may be called a "reference RB number $R\_N_{RB}$". A part or all of the TBSs of the other numbers $N_{RB}$ excluding the reference RB number $R\_N_{RB}$ may be defined based on the TBS values used in the reference RB number $R\_N_{RB}$. For example, if the number $N_{RB}$ which can transmit a packet can be selected in a range of 1 RB to 15 RBs and the reference RB number $R\_N_{RB}$ is 2, 5, 8, 11 and 14, a part or all of the TBSs in the number $N_{RB}=1, 3, 4, 6, 7, 9, 10, 12, 13,$ and/or 15 may be equal to the TBSs used in $N_{RB}=2, 5, 8, 11$ or 14. Defining the TBSs like this, it is possible to freely change the number $N_{RB}$ used at the time of a packet retransmission because different numbers $N_{RB}$ share the same TBS value.

The above-described method may be embodied by the following embodiments.

Embodiment 1

FIG. 2 is a view showing a method of defining a plurality of non-neighbor reference RB numbers $R\_N_{RB}$ which are not adjacent to each other, and reusing the TBSs used in the reference RB numbers $R\_N_{RB}$ for neighbor RB numbers $(N\_N_{RB})$ which are adjacent to the defined reference RB numbers $R\_N_{RB}$.

In FIG. 2, 100 modulation symbols are included in one RB and the number $N_{RB}$ is selected in the range of 1 RB to 15 RBs. In FIG. 2, shaded parts denote the reference RB numbers $R\_N_{RB}$ and the TBS values corresponding thereto. That is, referring to FIG. 2, the reference RB numbers $R\_N_{RB}$ are 2, 5, 8, 11 and 14 and the TBSs of the reference RB numbers $R\_N_{RB}$ are determined so as to satisfy the reference MCSs. For example, if five RBs are used and the MCS index is 3, the TBS is 5 $(=N_{RB})*100$ (=number of modulation symbols included in each RB)*2 (=modulation order (QPSK) at the MCS index of 4))*0.4 (=code rate at the MCS index 4)=400 bits (201). In addition, the neighbor RB numbers $N\_N_{RB}$ adjacent to the reference RB numbers $R\_N$ RB reuse the TBSs of the reference RB numbers $R\_N_{RB}$ without change. For example, it can be seen that the TBSs of the neighbor RB numbers $N\_N_{RB}$ of 1 and 3 adjacent to the reference RB number $R\_N_{RB}$ of 2 are the same as the TBSs used in the reference RB number $R\_N_{RB}$ of 2.

Embodiment 2

FIGS. 3 to 5 are views showing other embodiments of the present invention.

FIGS. 3 to 5 show a process of defining TBSs according to Embodiment 2. In the method of Embodiment 2, one or more reference RB numbers $R\_N_{RB}$ are defined, and a part of the TBSs defined in the defined reference RB numbers $R\_N_{RB}$ is shifted to a part of the TBSs of neighbor RB numbers $N\_N_{RB}$ adjacent to the reference RB numbers $R\_N_{RB}$ and is reused. The residual TBSs of the neighbor RB numbers $N\_N_{RB}$ are determined so as to satisfy the reference MCSs.

FIG. 3 shows a first step of Embodiment 2.

In FIG. 3, only a reference RB number $R\_N_{RB}$ of 1 is defined as a reference RB number $R\_N_{RB}$. That is, the TBSs in the reference RB number $R\_N_{RB}$ of 1 are defined so as to satisfy reference MCSs of (QPSK, 0.1), (QPSK, 0.2), (QPSK, 0.3), (QPSK, 0.4), (QPSK, 0.5), (16QAM, 0.6), (16QAM, 0.7), (16QAM, 0.8), and (16QAM, 0.9). For example, the TBS of 20 in the reference RB number $R\_N_{RB}$ of 1 satisfies 1 $(=N_{RB})*100$ (=number of modulation symbols included in each RB)*2 (=modulation order (QPSK) at the MCS index of 4)*0.1 (=code rate at the MCS index of 4)=20.

At this time, as shown in FIG. 3, in the present embodiment, TBS values 301 having high code rates of the TBSs defined in the reference RB number $R\_N_{RB}$ of 1 are shifted and copied to a low code rate part 302 of $N_{RB}=2$ and TBS values satisfying the reference MCSs are allocated to the residual part 303 of $N_{RB}=2$. That is, in $N_{RB}=2$, the TBSs of 480, 560, 640 and 720 are determined so as to respectively satisfy MCS=(16QAM, 0.6), (16QAM, 0.7), (16QAM, 0.8) and (16QAM, 0.9). For example, the TBS of 480 in $N_{RB}=2$ satisfies 2 $(=N_{RB})*100$ (=number of modulation included in each RB)*4 (=modulation order (QPSK) at the MCS index 5)*0.6 (=code rate at the MCS index 5)=480. That is, the TBSs 302 of which the MCS indexes are respectively 0, 1, 2, 3 and 4 in $N_{RB}$=2 are copied from a part of the TBSs defined in $N_{RB}$=1 and the TBSs 303 of which the MCS indexes are respectively 5, 6, 7 and 8 are determined so as to satisfy the reference MCSs.

FIG. 4 shows a second step of Embodiment 2.

At this time, as shown in FIG. 4, TBS values 401 having high code rates of the TBSs defined in the reference RB number R_$N_{RB}$ of 2 are shifted and copied to a low code rate part 402 of $N_{RB}$=3 and new TBS values suitable for the reference MCSs are allocated to the residual part 403 of $N_{RB}$=3. That is, in $N_{RB}$=3, the TBSs of 840, 960, and 1080 are determined so as to respectively satisfy MCS=(16QAM, 0.7), (16QAM, 0.8), and (16QAM, 0.9). For example, the TBS of 480 in $N_{RB}$=3 satisfies 3 (=$N_{RB}$)*100 (=number of modulation symbols included in each RB)*4 (=modulation order (QPSK) at the MCS index 6)*0.7 (=code rate at the MCS index 6)=840. That is, the TBSs 402 of which the MCS indexes are respectively 0, 1, 2, 3, 4 and 5 in $N_{RB}$=3 are copied from a part of the TBSs defined in $N_{RB}$=2 and the TBSs 403 of which the MCS indexes are respectively 6, 7 and 8 are determined so as to satisfy the reference MCSs.

FIG. 5 shows a set of TBSs obtained by repeating the process explained in connection with FIGS. 3 and 4 while increasing $N_{RB}$.

In FIG. 5, shaded parts are TBS values defined so as to satisfy the reference MCSs, which do not overlap with the other TBSs. Since the residual parts (=not shaded area) are reused TBS values, the same TBSs are efficiently shared between different numbers $N_{RB}$.

In the method of FIGS. 3 to 5, the TBSs having high code rates of the TBSs defined in the reference RB number R_$N_{RB}$ are shifted to the low code rate part of the neighbor RB number N_$N_{RB}$ adjacent to the reference RB number R_$N_{RB}$ and are reused. This method is performed while the number $N_{RB}$ is increased. For example, if the reference RB number R_$N_{RB}$ is 1, this method may be applied while the number $N_{RB}$ is increased.

In contrast, the TBSs having low code rates of the TBSs defined in the reference RB number R_$N_{RB}$ may be shifted to the high code rate part of the neighbor RB number N_$N_{RB}$ adjacent to the reference RB number R_$N_{RB}$ and may be reused. At this time, this method may be performed while the number $N_{RB}$ is decreased. For example, if it is assumed that the number $N_{RB}$ has a value of 1 to 15 and the reference RB number R_N RB is 15, this method may be applied while the number $N_{RB}$ is decreased.

Alternatively, the two above methods may be used together. For example, if it is assumed that the number $N_{RB}$ has a value of 1 to 15 and the reference RB number R_$N_{RB}$ is 7, the first method may be used with respect to the number $N_{RB}$ greater than 7 and the second method may be used with respect to the number $N_{RB}$ less than 7.

Although only one reference RB number R_$N_{RB}$ is set in this embodiment, a plurality of reference RB numbers R_$N_{RB}$ which are not adjacent to each other may be set and the same method may be applied.

Embodiment 3

FIGS. 6 and 7 are views showing other embodiments of the present invention.

According to Embodiment 2, although different neighbor numbers $N_{RB}$ share the TBSs, there are many TBSs which do not satisfy the reference MCSs. For example, in FIG. 5, in $N_{RB}$=7, in order to satisfy the reference MCS of (QPSK, 0.1), the TBS should be 7 (=$N_{RB}$)*100 (=number of modulation symbols included in each RB)*2 (=modulation order (QPSK) at the MCS index 0)*0.1 (=code rate at the MCS index 0)=140. However, actually, it can be seen that the TBS is set to 960.

Embodiment 3 relates to a method of more accurately or closely satisfying the reference MCSs while different numbers $N_{RB}$ share the same TBS. In Embodiment 3, first, the reference RB number R_$N_{RB}$ is defined. Next, for the numbers $N_{RB}$ except the reference RB number R_$N_{RB}$, TBSs, which most satisfy the reference MCSs, of the TBS values derived from the reference resource block number R_$N_{RB}$ are selected and used.

In FIGS. 6 and 7, the reference RB number R_$N_{RB}$ is set to 1, that is, only one reference RB number R_$N_{RB}$ is selected. FIG. 6 shows a first step for defining the TBSs according to Embodiment 3 and FIG. 7 shows a second step for defining the TBS according to Embodiment 3.

Referring to FIG. 6, TBSs which most satisfy the reference MCSs in $N_{RB}$=2 are selected from the TBSs defined in $N_{RB}$=1 and are allocated to a low code rate part 601 of $N_{RB}$=2, and the TBS values which satisfy the reference MCSs are newly calculated and are allocated to the residual part 602. For example, in $N_{RB}$=2, the TBS values which satisfy the reference MCSs having the MCS indexes of 0, 1, 2, 3 and 4 are respectively 40, 80, 120, 160 and 200, but the TBSs of 120, 160 and 200 are not present in the TBSs defined in $N_{RB}$=1. Accordingly, the TBSs of 120, 160 and 200 are replaced with 100, 100 and 240, which are nearest to 120, 160 and 200 in the TBSs defined in $N_{RB}$=1.

Referring to FIG. 7, TBS values which most satisfy the reference MCSs in $N_{RB}$=3 are selected from the TBSs defined in $N_{RB}$=1 and $N_{RB}$=2 and are allocated to the low code rate part 701 of $N_{RB}$=3, and the TBS values which satisfy the reference MCSs are newly calculated and are allocated to the residual part 702. For example, in $N_{RB}$=4, the TBS values which satisfy the reference MCSs having the MCS indexes of 0, 1, 2, 3, 4 and 5 are respectively 60, 120, 180, 240, 300 and 720, but the TBSs of 120, 180 and 300 are not present in the TBSs defined in $N_{RB}$=1 and $N_{RB}$=2. Accordingly, the TBSs of 120, 180 and 300 are replaced with 100, 240 and 320, which are nearest to 120, 180 and 300 in the TBSs defined in $N_{RB}$=1 and $N_{RB}$=2.

A set of TBSs can be determined by repeating the method of defining the TBSs shown in FIGS. 6 and 7 while the number $N_{RB}$ is increased. By this method, the different numbers $N_{RB}$ can share the same TBS values and the TBSs of each number $N_{RB}$ can satisfy the reference MCSs.

The method shown in FIGS. 6 and 7 is performed while the number $N_{RB}$ is increased. At this time, the TBSs derived from the reference RB number R_$N_{RB}$ are reused in the low code rate parts of other numbers $N_{RB}$. For example, the reference RB number R_$N_{RB}$ may be 1. In contrast, the method shown in FIGS. 6 and 7 is performed while the number $N_{RB}$ is decreased. At this time, the TBSs derived from the reference RB number R_$N_{RB}$ are reused in the high code rate parts of other numbers $N_{RB}$. For example, if it is assumed that the number $N_{RB}$ has a value of 1 to 15, the reference RB number R_$N_{RB}$ may be 15. In contrast, the two above methods may be used together. If it is assumed that the number $N_{RB}$ has a value of 1 to 15 and the reference RB number R_$N_{RB}$ is 7, the first method may be used with respect to the number $N_{RB}$ greater than 7 and the second method may be used with respect to the number $N_{RB}$ less than 7.

Although only one reference RB number $R\_N_{RB}$ is set in this embodiment, a plurality of reference RB numbers $R\_N_{RB}$ which are not adjacent to each other may be set and the same method may be applied.

Another embodiment of the present invention relates to a method of determining the TBSs of the data packet in a wireless mobile communication system in which the number $N_{RB}$ of the transmitted data packet is variably allocated.

First, the number $N_{RB}$ allocated to the data packet and the reference MCS index applied to the data packet of the plurality of predetermined reference MCS indexes are received. Then, the TBS indicated by the combination of the received number $N_{RB}$ and the received reference MCS index is determined. The TBS indicated by the combination of the received number $N_{RB}$ and the received reference MCS index may be obtained by other embodiments of the present invention.

The TBS values obtained by the methods of the above-described embodiments may be represented by one table. The transmitter and the receiver can determine the TBS of each transmitted packet by utilizing the number $N_{RB}$ and the MCS (or the MCS index) for transmitting the packet.

In the method of allocating the TBS values to the combination of the MCS and the number $N_{RB}$, it is assumed that 100 modulation symbols are transmitted per RB. However, the number of modulation symbols per RB may be changed according to the characteristics (a time location, a frequency location, a CDM code or the like) of each RB.

In another embodiment of the present invention, the number of reference modulation symbols which can be transmitted per RB is previously determined and the TBS value is obtained using any one of the above-described embodiments. Next, the TBS value which is actually used may be adjusted according to a ratio of the number of reference modulation symbols and the number of modulation symbols which can be actually transmitted. For example, as described above, if the number of reference modulation symbols to be transmitted per RB is set to 100 and the TBS is obtained using Embodiment 1, the TBSs shown in FIG. 2 can be obtained. At this time, if the number of modulation symbols which can be actually transmitted is 200, it is possible to generate a set of TBSs which are actually used, by multiplying the TBS values of FIG. 2 by 2.

In addition, if one base station controls packet transmissions of a plurality of mobile stations, the packet transmission power (or power density; hereinafter, for convenience of description, referred to as power) of each of the mobile stations may be determined according to the MCSs applied to their packets. For example, at any mobile station, if the transmission power of a packet having an MCS index of 0 is decided to P at any time, the transmission power of a packet having an MCS index of i may be decided to $P+\Delta(i)$. For example, in FIG. 1, if the transmission power of the packet 103 having the MCS index of 0 in $N_{RB}=1$ is decided to P0, the transmission power of the packet 104 having the MCS index of 1 in $N_{RB}=1$ is decided to $P+\Delta(1)$ and the transmission power of the packet 105 having the MCS index of 2 in $N_{RB}=1$ is decided to $P+\Delta(2)$. That is, the value $\Delta(i)$ may be decided in advance with respect to the number $N_{RB}$ including the TBSs which satisfy the reference MCSs.

However, if the TBS allocation method of the present invention is applied, all the TBSs in a reference RB number $R\_N_{RB}$ satisfy the reference MCSs, but at least a part of the TBSs in the numbers $N_{RB}$ except the reference RB number $R\_N_{RB}$ may not satisfy the reference MCSs. Accordingly, in another embodiment of the present invention, a reference transmission power offset $\Delta(i)$ of the reference MCSs is previously defined with respect to the reference RB number $R\_N_{RB}$, and the reference transmission power offset $\Delta(i)$ is additionally adjusted with respect to the number $N_{RB}$ excluding the reference RB number $R\_N_{RB}$. That is, if the mobile station transmits the packet using the reference RB number $R\_N_{RB}$, the packet transmission power is decided by the reference transmission power offset $\Delta(i)$. If the packet is transmitted using another number $N_{RB}$ instead of the reference RB number $R\_N_{RB}$, the reference transmission power offset $\Delta(i)$ may be adjusted using a difference between or a ratio of an actual MCS and a reference MCS.

For example, in FIG. 5, a TBS having the number $N_{RB}$ of 2 and the MCS index of 4 is 360. However, if it is assumed that the TBS having the number $N_{RB}$ of 2 and the MCS index of 4 satisfies the reference MCS, the TBS should be $2 (=N_{RB})*100$ (=number of modulation symbols included in each RB)*2 (=modulation order (QPSK) at the MCS index 4))*0.5 (=code rate at the MCS index 4)=200. Accordingly, in this case, the reference MCS may have the modulation order of 2 (QPSK) and the code rate of 0.5, but the actual MCS of FIG. 5 may have the modulation order of 2 (QPSK) and the code rate of 0.5*360/200=0.9. Accordingly, the reference transmission power offset $\Delta(i)$ may be additionally adjusted on the basis of the calculated ratio of the reference MCS and the actual MCS.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. In addition, embodiments may be configured by combining claims which do not have an explicit citation relationship therebetween or new claims may be added by an amendment after the application.

The embodiments of the present invention can be implemented by a variety of means, for example, hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be used in a transmitter and a receiver used in a wideband wireless mobile communication system.

The invention claimed is:

1. A method of determining a transport block size (TBS) of a received data packet in a wireless mobile communication system, the method comprising:

receiving a value of a number of wireless resource blocks allocated to the data packet and receiving a reference modulation coding scheme (MCS), which is applied to the data packet, of a plurality of different predetermined reference MCSs; and determining the TBS indicated by a combination of the received value of the number of wireless resource blocks and the received reference MCS, wherein a plurality of different second size values corresponding to a second value of the received value of the number of wireless resource blocks satisfies the plurality of predetermined reference MCSs, and a plurality of different first size values corresponding to a first value of the received value of the number of wireless resource blocks are equal to the plurality of different second size values, and the first value is greater or less than the second value by 1, wherein the TBS is equal to at least one of the plurality of different second size values, or at least one of the plurality of different first size values.

2. A method of determining a transport block size (TBS) of a received data packet in a wireless mobile communication system, the method comprising:

receiving a value of a number of wireless resource blocks allocated to the data packet and receiving a reference modulation coding scheme (MCS), which is applied to the data packet, of a plurality of different predetermined reference MCSs; and determining the TBS indicated by a combination of the received value of the number of wireless resource blocks and the received reference MCS, wherein a part of a plurality of different first size values corresponding to a first value of the received value of the number of wireless resource blocks is equal to a part of a plurality of different second size values corresponding to a second value of the received value of the number of wireless resource blocks, wherein the first value is greater or less than the second value by 1, and the residual part of the plurality of different first size values satisfies the plurality of different predetermined reference MCSs, wherein the TBS is equal to at least one of the plurality of different second size values, or at least one of the plurality of different first size values.

3. The method according to claim 2, wherein the code rate of the part of the plurality of different first size values is less than the code rate of the residual part of the plurality of different first size values, and the first value is greater than the second value by 1.

4. The method according to claim 3, wherein the part of the plurality of different second size values includes n upper-level second size values including a second size value having a highest code rate among the plurality of different second size values, and n is a predetermined value.

5. The method according to claim 2, wherein the code rate of the part of the plurality of different first size values is greater than the code rate of the residual part of the plurality of different first size values, and the first value is less than the second value by 1.

6. The method according to claim 5, wherein the part of the plurality of different second size values equals n lower-level second size values including a second size value having the lowest code rate among the plurality of different second size values, and n is a predetermined value.

7. The method according to claim 2, wherein the code rate of the part of the plurality of different first size values is less than the code rate of the residual part of the plurality of different first size values, and the first value is greater than the second value.

8. The method according to claim 2, wherein the code rate of the part of the plurality of different first size values is greater than the code rate of the residual part of the plurality of different first size values, and the first value is less than the second value.

9. The method according to claim 2, wherein each of the plurality of different second size values satisfies a reference MCS corresponding the each of the plurality of different second size values in the plurality of different predetermined reference MCSs.

* * * * *